United States Patent [19]

Kemeny

[11] Patent Number: 5,560,162
[45] Date of Patent: Oct. 1, 1996

[54] SEISMIC BRAKE

[75] Inventor: Zoltan A. Kemeny, Tempe, Ariz.

[73] Assignee: Tekton, Tempe, Ariz.

[21] Appl. No.: 215,738

[22] Filed: Mar. 22, 1994

[51] Int. Cl.$^6$ ........................................... E04H 9/02
[52] U.S. Cl. ........................... 52/167.3; 52/167.9
[58] Field of Search ............................ 52/167.3, 169.9, 52/167.1; 248/74.4, 316.6, 219.4

[56] References Cited

U.S. PATENT DOCUMENTS

| | | | |
|---|---|---|---|
| 3,606,704 | 9/1971 | Denton | 52/167.3 X |
| 4,004,766 | 1/1977 | Long | 248/74.4 X |
| 4,182,504 | 1/1980 | Bernhard | 248/74.4 X |
| 4,262,869 | 4/1981 | Menshen | 248/74.4 |
| 4,270,250 | 6/1981 | Schön | 248/74.4 X |
| 4,577,826 | 3/1986 | Bergström et al. | 52/167.9 X |
| 5,065,552 | 11/1991 | Kobori et al. | 52/167.3 X |

*Primary Examiner*—Carl D. Friedman
*Assistant Examiner*—Yvonne Horton Richardson
*Attorney, Agent, or Firm*—Snell & Wilmer

[57] ABSTRACT

A seismic brake assembly comprises an annular pipe journaled through a gripping block which frictionally engages the pipe about the pipe's outer diameter. The force with which the gripping block frictionally engages the pipe is controlled by a Belleville or spring-loaded washer. By securing the gripping block to one point in a structure and by securing one end of the pipe to another point in or associated with the same building or structure to be supported, the seismic brake functions as a rigid member of applied lateral stresses less than a design threshold. When the applied lateral force exceeds the design threshold, controlled sliding friction between the rod and gripping block is experienced, whereupon the building or structural framing returns the seismic brake to its nominal position when the seismic activity ceases. By controlling various factors including the diameter of the pipe and the tension with which the block engages the pipe, virtually any desired hysteresis loop may be achieved.

20 Claims, 17 Drawing Sheets

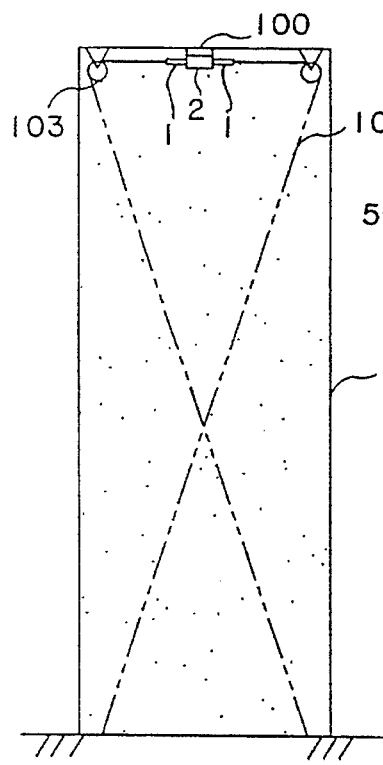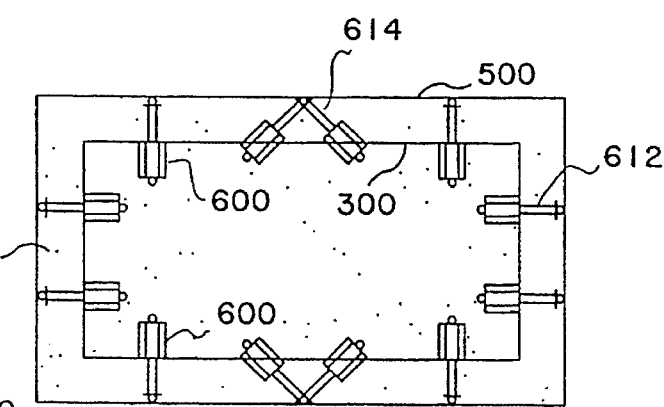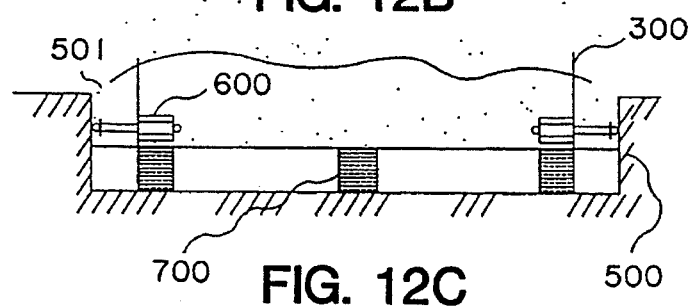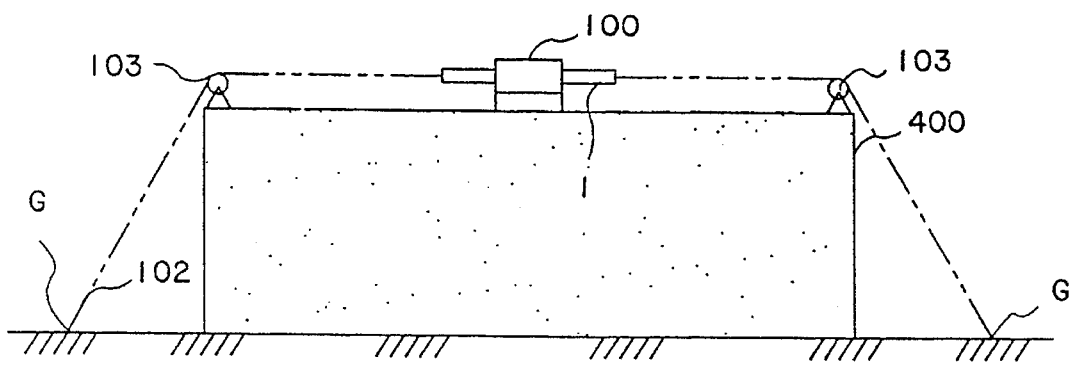
FIG. 12A
FIG. 12B
FIG. 12C
FIG. 12D

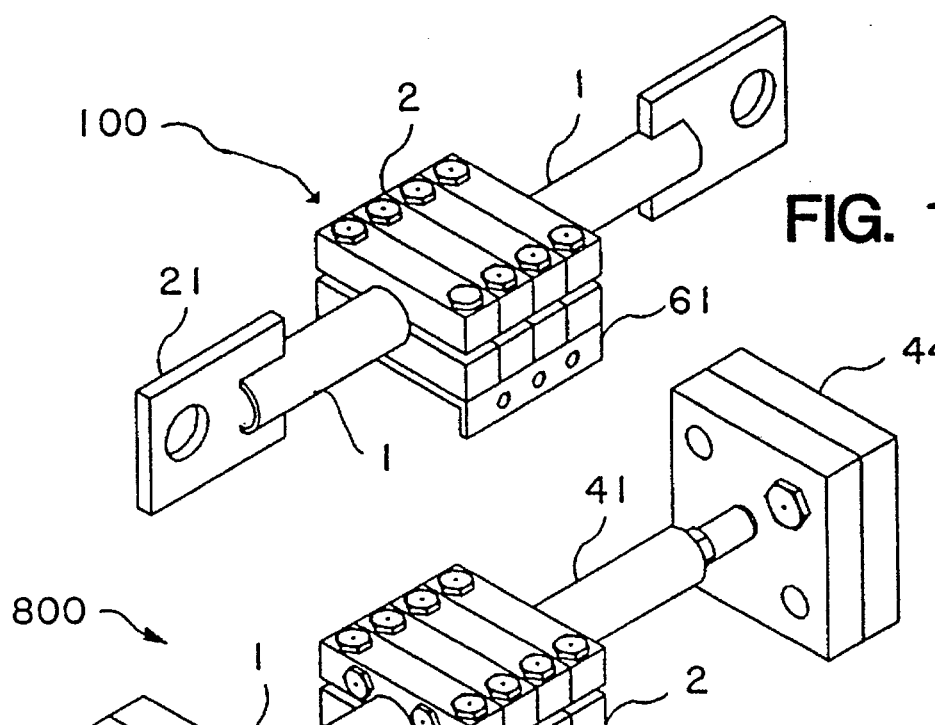
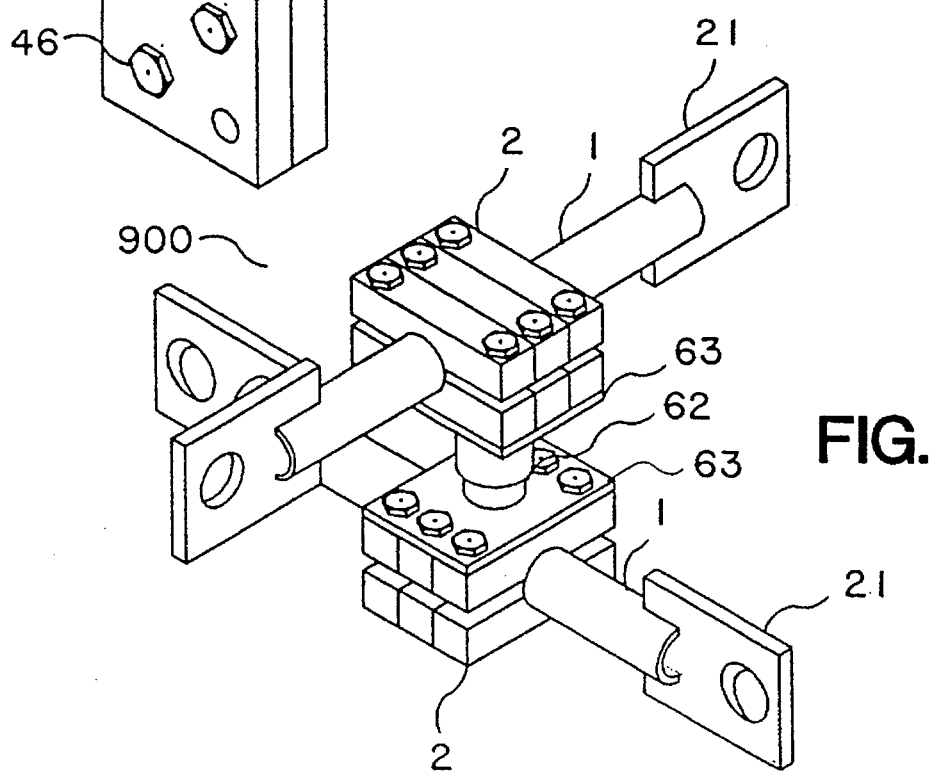

SEISMIC BRAKE

TECHNICAL FIELD

The present invention relates, generally, to seismic brakes (dampers) for use in buildings, bridges, and other structures and, more particularly, to seismic brakes utilizing steel pipes and rods gripped by steel blocks lined with low friction material for frictionally engaging the rod or pipe.

BACKGROUND OF THE INVENTION

It is common to brake earthquake and wind induced structural movements by using supplemental dampers (which function to dissipate seismic and wind energy). This is particularly true when high amplitude or high frequency structural movements are expected. The brakes slow down and ultimately stop dynamic structural motion. Buildings and bridges with added dampers are safer and often more economical to construct in seismic and hurricane zones than those without dampers. Added dampers are also used to reduce seismic isolator displacements in structures.

At least three known mechanisms are typically utilized in such dampers: the viscosity of liquids or elastomers; metallic yielding; and coulomb friction. Each have been proposed or used in a different way. Each has its merits and drawbacks.

For instance, a liquid damper for construction needs special fluid, sealing, heat control and corrosion protection. It needs to be designed for infrequent, short duration, high power operation. One known liquid design is offered by Taylor Devices, Inc. These devices are, however, the most expensive of all dampers.

More economical, but less efficient, is a visco-elastomeric damper disclosed in Fyfe et al. U.S. Pat. No. 4,605,106 and available from the 3M company. Visco-elastomeric dampers, however, are bulky, aging and embrittling devices.

The third known alternative is a hysteretic damper utilizing steel yielders. Several such devices have been proposed but few are actually in use. One such steel yielder is disclosed in White U.S. Pat. No. 4,823,522.

The most economical and effective of all dampers rely on coulomb friction. These are unreliable, however, to the extent electrical and/or magnetic power sources are compromised. Teflon coated stainless steel bearings for seismic isolation and energy dissipation have also been proposed. However, these rely on gravity load and, as such, are not applicable as added dampers in interstory applications.

Popov et al. proposed a long slotted friction damped structural connection with copper linings and cup washer loading. While the Popov et al. damper appears to be a viable solution to structural damping, it is not a supplemental damper and not a device; rather, it has to be built with the structure as an integral part of it.

Because of the substantial expense associated with integrating dampers into new construction, supplemental dampers which can be retrofitted into existing buildings and structures are highly desirable. Indeed, the demand for supplemental seismic dampers for use in retrofitting applications is estimated to be over ten times greater than dampers used in new construction in the U.S. today.

Moreover, the hysteretic loop of typical friction devices is rectangular. Triangular and elliptical hysteretic loop shapes, however, may be more suitable for certain seismic applications. With rectangular hysteresis devices the lateral force is equally high at zero and at maximum support displacement. For elliptical hysteresis devices, on the other hand, at maximum displacement the lateral force is zero. That is ideal for many seismic applications. For different applications, however, it may be desirable to custom design the most suitable hysteresis loop shape.

A seismic damper design and methods and apparatus for installing the damper in a variety of applications is therefore needed which overcome the shortcomings of the prior art.

SUMMARY OF THE INVENTION

The present invention provides seismic damping devices which overcome many of the shortcomings of the prior art. In particular, the preferred embodiment of the subject seismic damper comprises a hollow steel pipe which extends through a series of collar mechanisms, each collar mechanism being configured to grip the circumference of the steel pipe with a predetermined force. The various collars are secured to the structure to be supported, while the pipe is secured to the foundation which supports the structure. As the structure moves with respect to its foundation, for example due to externally applied seismic activity, the frictional force between the collars and the pipe is calculated to be overcome at a predetermined threshold seismic force, allowing for relative slippage between the pipe and the collars.

In accordance with an alternate embodiment of the present invention, various configurations of the seismic brake permit its use in a variety of contexts and applications, for example in beam-to-column building construction joints, cable mounted building damping systems, and the like.

In accordance with a further aspect of the invention, a collar insert may be employed within the collars to frictionally engage the pipe, with the materials of the pipe and inserts being selected to achieve a desired combination of static and kinetic friction coefficients. Moreover, by adjusting the tension with which the collars grasp the pipe, and/or by varying the diameter of the pipe along its length in the region of sliding interaction with the collar, virtually any desired hysteresis response loop may be produced.

In accordance with a further aspect of the present invention, pivoting and/or universal joints may be employed such that the subject seismic brake may be mounted in virtually any orientation and designed to dampen energy while minimizing or reducing bending movements on the pipe employed in the seismic brake. In addition, the seismic brake may be suitably designed to exhibit sufficient stroke to accommodate even very high amplitude structural movements due to seismic activity, wind, and the like.

In accordance with yet a further aspect of the present invention, triangular, elliptical, rectangular, transitive, or any other desired hybrid hysteretic loop shape may be achieved by adjusting one or more of the parameters of the subject seismic brake.

In accordance with yet a further aspect of the present invention, field inspection and replacement of the frictional elements of the seismic brake, and particularly the collar liners which engage the pipe, may be quickly and easily effected.

In accordance with a further aspect of the present invention, wet or dry lubricants may be employed to control the degree of friction, thermal dissipative and noise properties of the subject brake.

BRIEF DESCRIPTION OF THE DRAWINGS FIGURES

The subject invention will hereinafter be described in conjunction with the appended drawing figures, wherein like numerals denote like elements, and:

FIG. 12A is a schematic view of a cable activated damper application of the subject seismic brake in a high-rise building;

FIG. 12B is a schematic diagram of a seismic base isolation application of the subject seismic brakes;

FIG. 12C is a close up view of the isolation pit of FIG. 12B;

FIG. 12D is a schematic diagram of a cable actuated damper application of the subject seismic brake in a low-rise building;

FIG. 15A is an alternate embodiment of the subject seismic brake configured for roof, ceiling, and other mounting applications;

FIG. 15B is an alternate configuration of the subject seismic brake particularly useful for diagonal brace applications;

FIG. 15C is a dual seismic brake arrangement useful in base isolation applications;

DETAILED DESCRIPTION OF PREFERRED EXEMPLARY EMBODIMENTS

Figures 1, 1A:
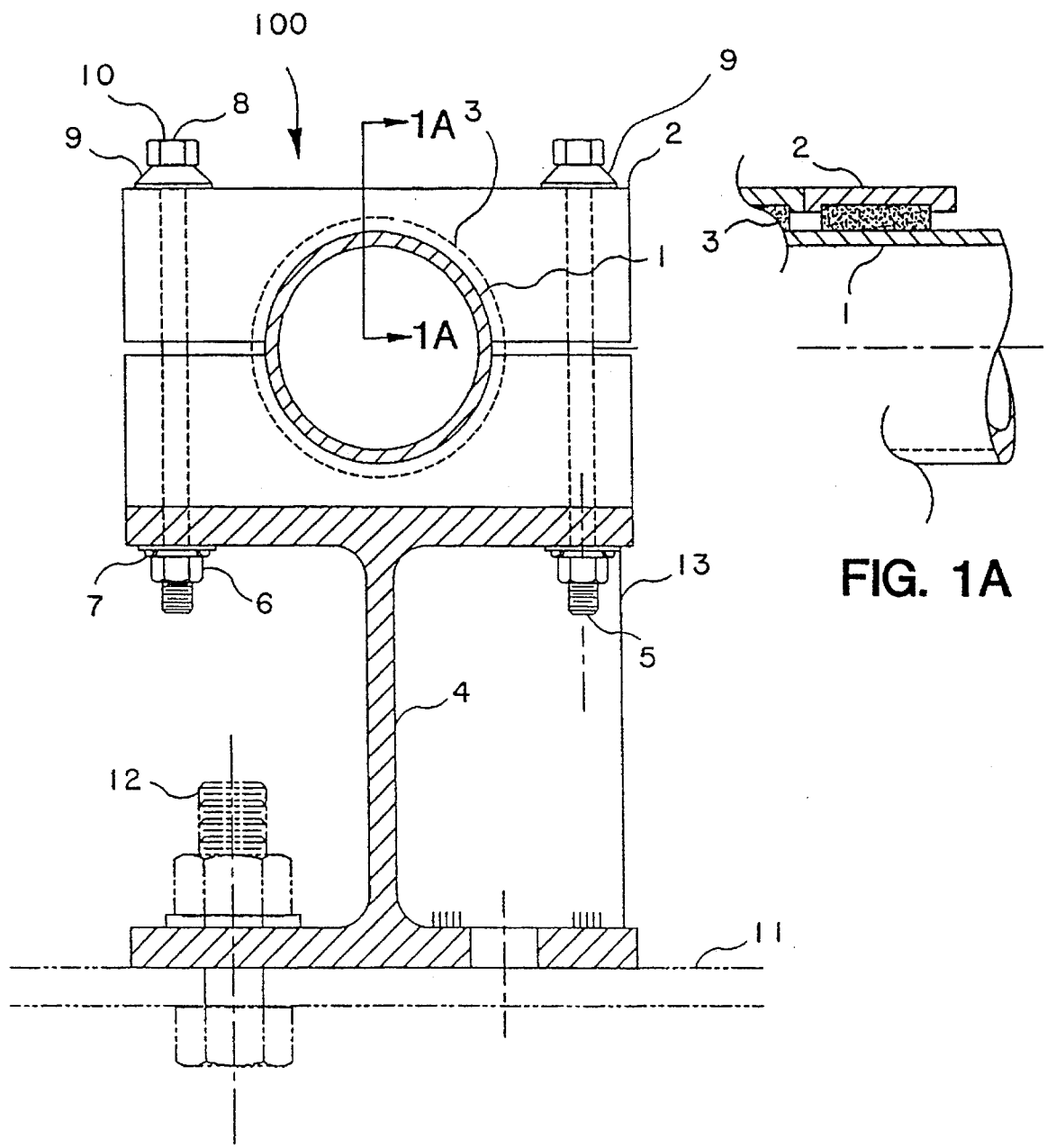
FIG. 1 is a side elevation view of a pipe engaged by a collar assembly in accordance with a first embodiment of the present invention.
FIG. 1A is a partial cross-section view of the pipe, collar, and insert assembly taken along line 1A—1A of FIG. 1.
Figure 2:
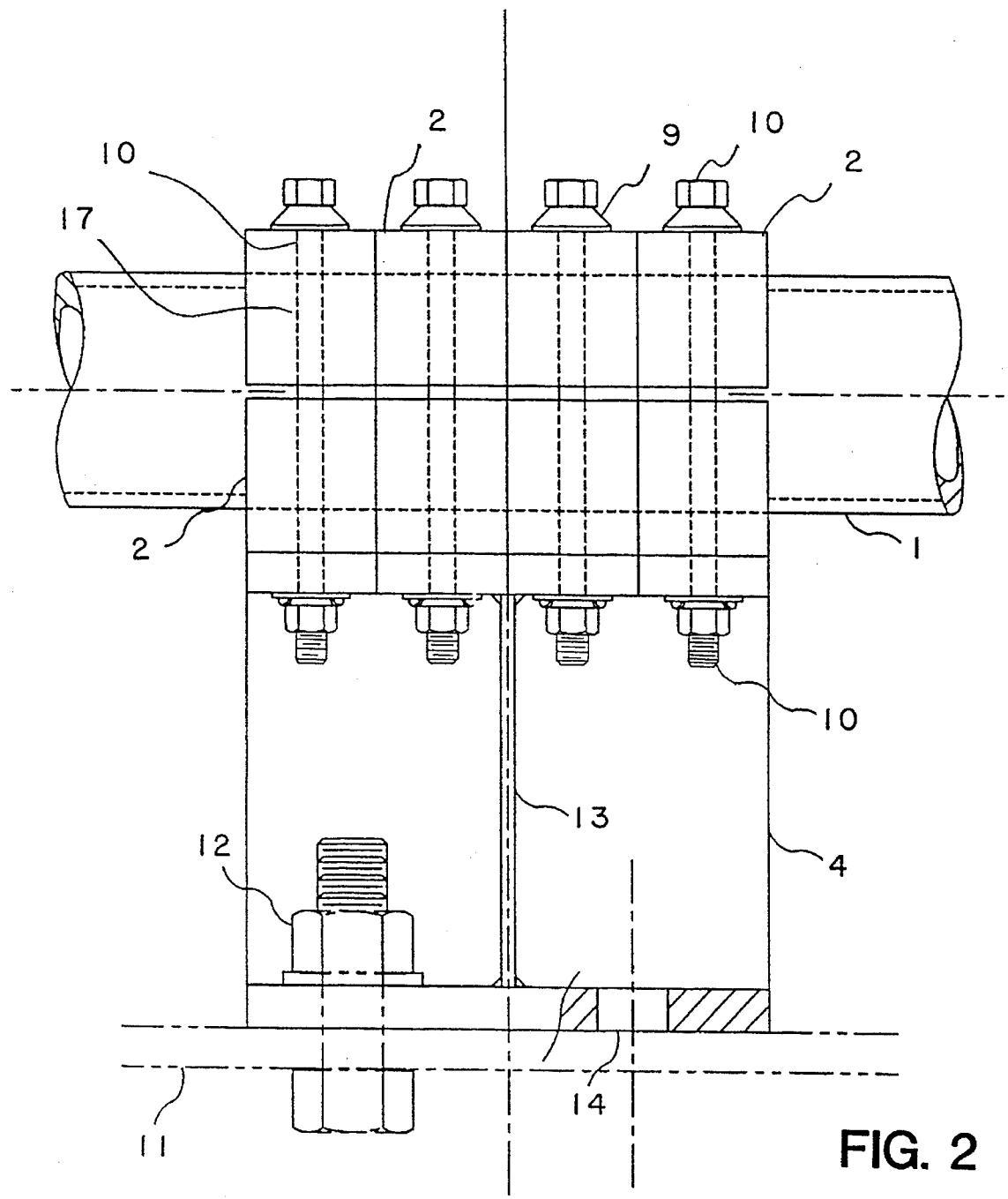
FIG. 2 is a side elevation view of the seismic brake assembly shown in FIG. 1.
Figure 3:
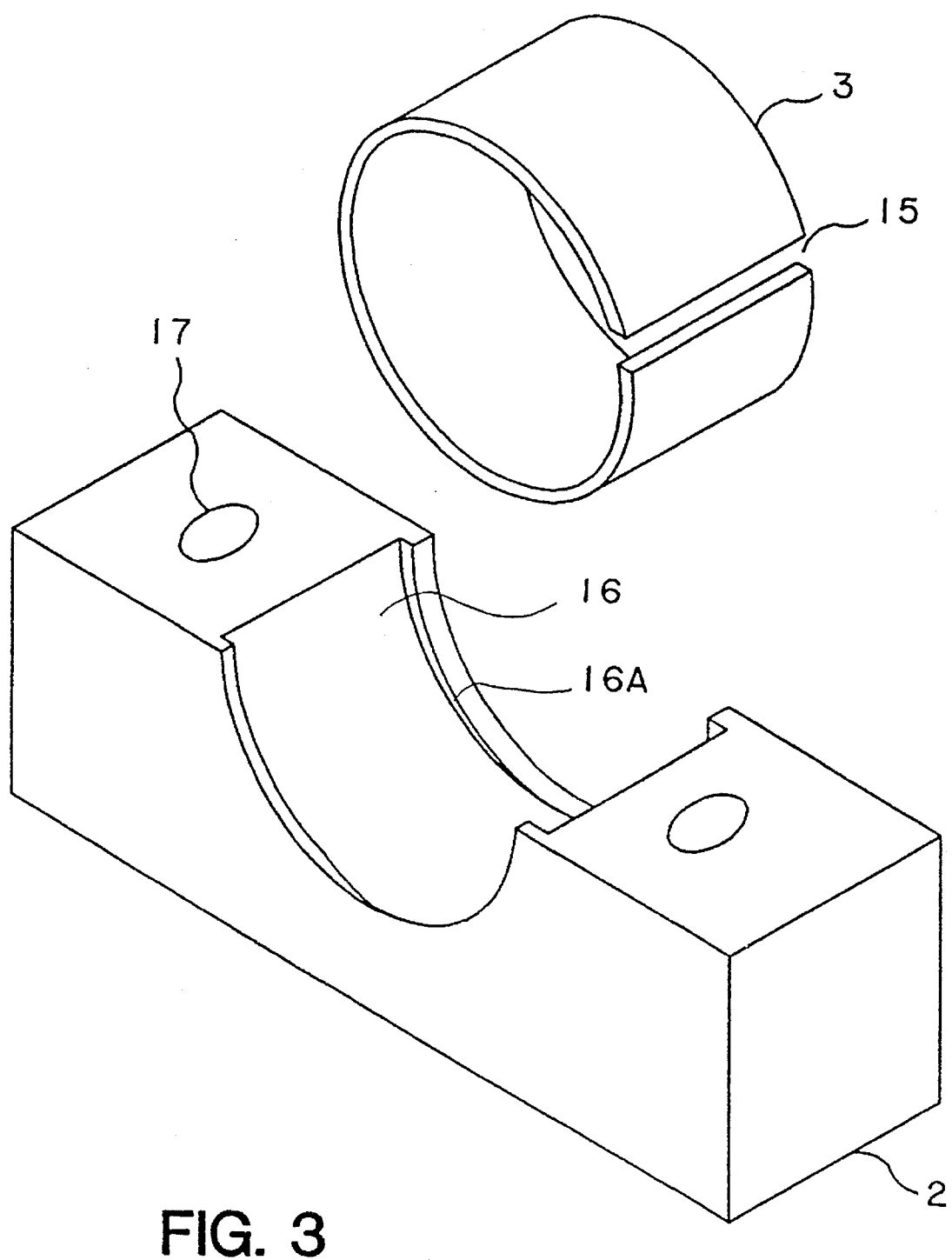
FIG. 3 is an exploded view of an exemplary collar and its associated insert.

Referring now to FIGS. 1–3, an exemplary seismic brake assembly 100 suitably comprises an elongated circular pipe 1 configured to extend through a plurality of individual blocks (collars) 2, each of said collars suitably comprising respective first and second mating halves each defining a semi-circular recess 16 therewithin, and an insert segment (liner) 3 circumferentially disposed about pipe 1 intermediate pipe 1 and block 2.

In accordance with one aspect of the present invention, block 2 may comprise one or a plurality of individual blocks, depending on desired performance characteristics. For example, a single, elongated block may be employed in certain applications, for example wherein hydraulic, electronic, or pneumatic mechanisms may be employed to control the tension with which the blocks "squeeze" the pipes; in the preferred embodiment shown in FIG. 2, block 2 suitably comprises a plurality of similar blocks disposed adjacent to one another. By adjusting the number of blocks, the surface area of contact between the block (or liner) and the pipe, as well as the coefficient of friction between block (or liner) and the pipe in conjunction with the tension with which the two block halves are urged against the pipe, the desired aggregate frictional force may be applied to the pipe. The use of a greater number as opposed to a fewer number (e.g., 1) of blocks also affords several additional advantages, including thermal dissipation and the convenient discharge of material from the frictional interface which may become dislodged or otherwise removed from either the outer surface of the pipe or the inner surface of the collars (or liners) during frictional engagement. By removing this debris from the system, frictional spikes at the friction interface may be reduced or eliminated.

Liner 3 may be suitably made from teflon, Delrin Black, hardened brass with or without a teflon coating, a graphite-bronze matrix, or any other convenient material to achieve desired friction and strength characteristics. Indeed, liner 3 may be dispensed with entirely, using the material properties of block 2 to directly contact pipe 1, if desired, although it may be more economical to employ a liner 3 so that the mechanical characteristics of the friction surface may be carefully controlled, thereby allowing the remainder of collar 2 to be made of any suitable material without regard to its frictional characteristics.

The gripping force by which respective blocks 2 engage pipe 1 is suitably controlled in accordance with a first embodiment of the present invention by the combination of bolt 10, having a head or nut 8, oppositely restraining nut 6, cup washer 9, and tension indicator washer 7.

More particularly, washer 9 may comprise any suitable washer capable of maintaining applied tension, for example a Belleville washer, coil spring, spring washer, or the like. This is particularly important in high cycle applications, wherein it is anticipated that pipe 1 may slidingly engage liners 3 a number of times, such that material may be removed from one or both surfaces of pipe 1 and respective liners 3. As material is removed and liberated from the system, the tension with which the blocks grasp pipe 1 might otherwise be correspondingly reduced, absent cup washers 9 or their functional equivalent.

Tension indicator washer 7 may comprise any convenient device for displaying an indication of the level of tension applied to bolt 10. For example, indicator washer 7 may comprise a series of pre-punched divots or dimples, which are designed to collapse upon the application of a pre-determined amount of tension to the bolt system, whereupon the collapse of the dimples yields a visual indicator of a threshold tension.

In the embodiment shown in FIGS. 1 and 2, seismic brake assembly 100 is suitably secured to a channel member 4, shown in cross-section in FIG. 1. If desired, channel member 4 may be stiffened through the use of suitable stiffener plates 13. Channel 4 may be suitably secured to a foundation or other datum 11, for example through the use of respective bolting assemblies 12 extending through anchor bolt holes 14. When seismic brake assembly 100 is so mounted, one or both ends of pipe 1 may be suitably affixed to the structure sought to be stabilized, as discussed in greater detail below. In this regard, it will be understood that the structure to be stabilized and the datum to which the structure is anchored are used illustratively; that is, seismic brake assembly 100 is intended to control (e.g., dampen) relative motion between two structural points. Thus, the pipe or the gripping block may be attached to the relatively moving structures in virtually any convenient manner.

With momentary reference to FIG. 3, each half comprising block 2 suitably comprises an arcuate recess 16 into which liner 3 may be conveniently disposed, and a bolt hole 17 through which bolt 10 is received. Although liner 3 is shown with a single slot 15 to facilitate compression, it will be understood that liner 3 may comprise any suitable configuration, including multiple slots or no slots. Moreover, slot 15 need not extend axially, but may assume any desired configuration which permits liner 3 to tightly grasp the pipe under the force exerted upon the liner by collar 2. In addition, recess 16 suitably includes respective shoulders 16A which effectively secure liner 3 as pipe 1 is urged through the blocks during sliding frictional engagement of the pipe with respect to the blocks.

Figure 4:
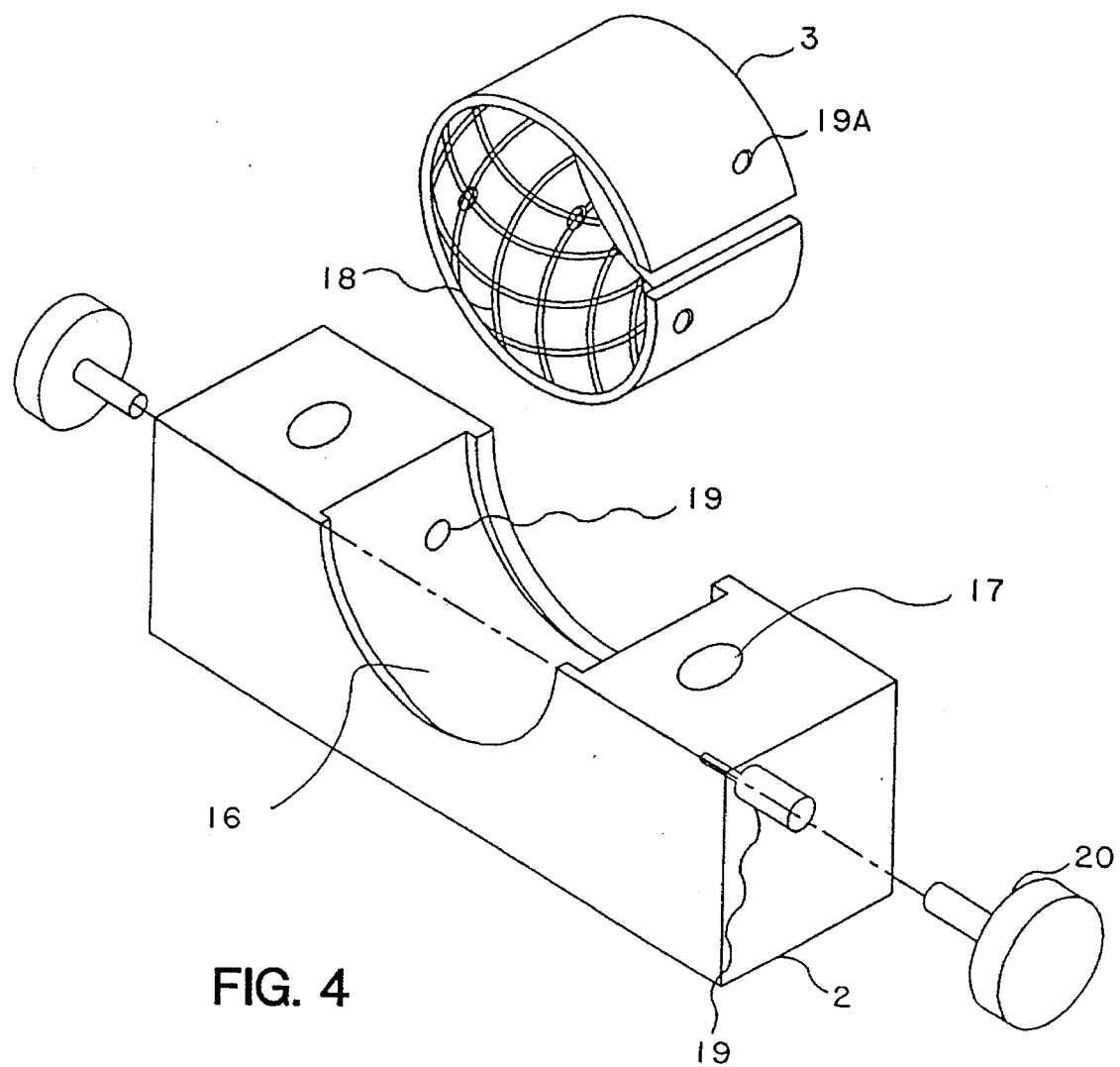
FIG. 4 is an alternate embodiment of an exemplary collar and insert, showing a lubrication system integral therewith.

Referring now to FIG. 4, block 2 may be suitably configured for the application of a lubricating substance by the incorporation of grease paths 19 through which a preferably spring loaded dash pot 20 may apply grease into recess 16. Dash pot 20 functions in the nature of a syringe, and is suitably preloaded with a sufficient amount of lubricant for the useful life of the device; alternatively, plugs 20 may be replaced in the field to ensure an adequate supply of lubricant.

With continued reference to FIG. 4, lubricant enters recess 16 through hole 19 in block 2, and penetrates corresponding holes 19a in liner 3, whereupon the lubricant is urged through passages 18 on the inner surface of liner 3. If desired, liner 3 may be secured to block 2, for example through recessed bolts, to ensure registration (alignment) between respective holes 19 in block 2 and respective holes 19a in liner 3.

Figure 5:
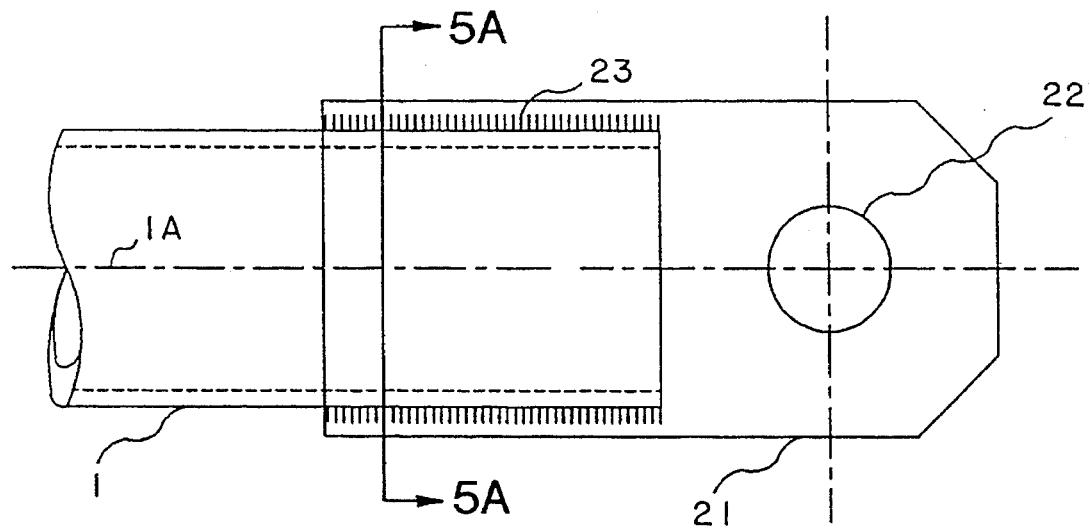
FIG. 5 is a front elevation view of an exemplary pivot assembly, showing a pivot plate welded to a pipe end.
Figure 5A:
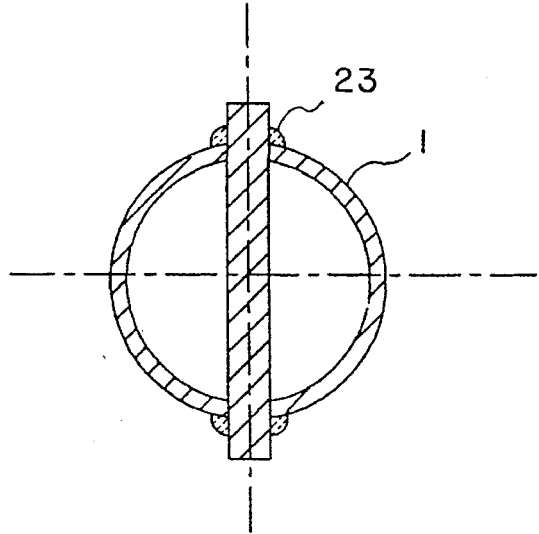
FIG. 5A is a cross-section view taken along line 5A—5A of FIG. 5.

Referring now to FIG. 5, a hinge plate 21 including a bolt hole 22 may be secured to one or both ends of pipe 1 by a suitable weld 23. As best seen in FIG. 5A, pipe 1 may be conveniently slotted to permit the pipe to receive hinge plate 21 prior to welding. In the preferred embodiment, the center line of hole 22 suitably coincides with the axial centerline 1a of pipe 1.

Figure 6:
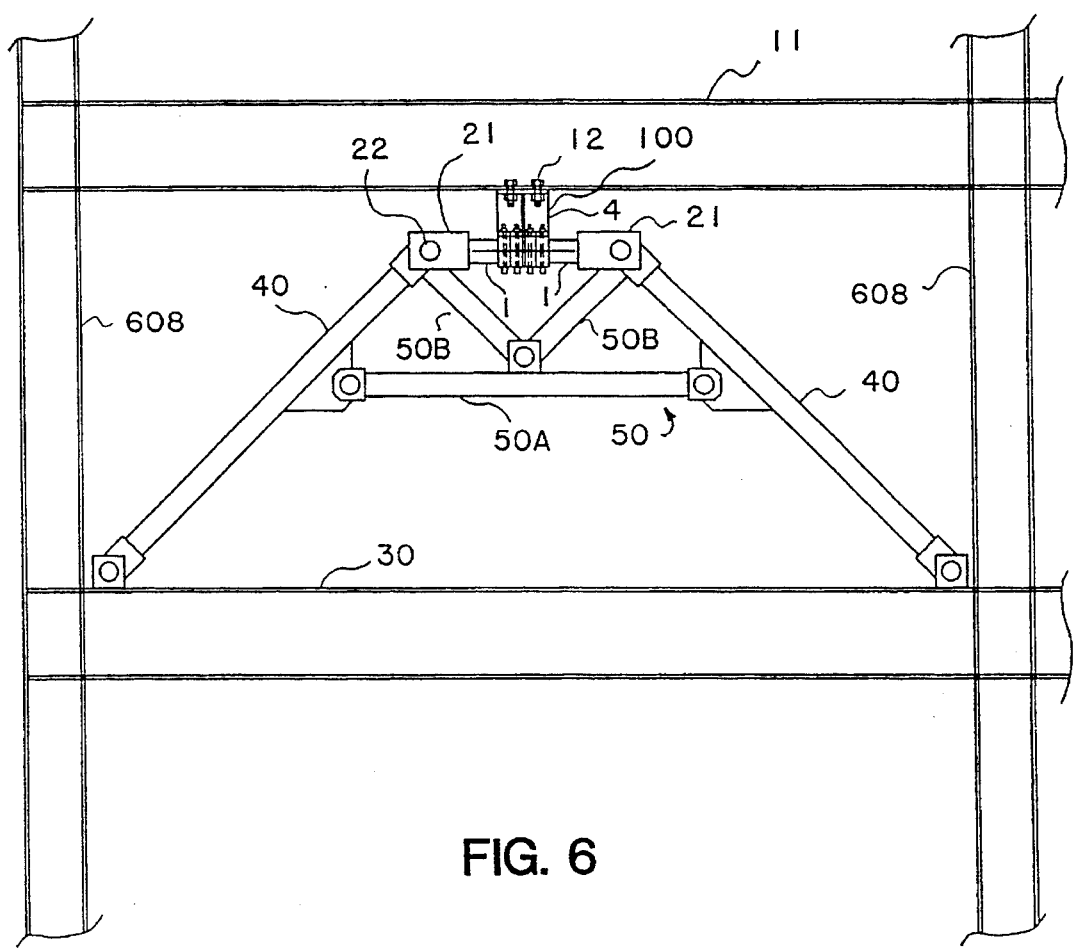
FIG. 6 is a modified chevron brace configuration showing application of an exemplary seismic brake in a beam to column environment.
Figure 7:
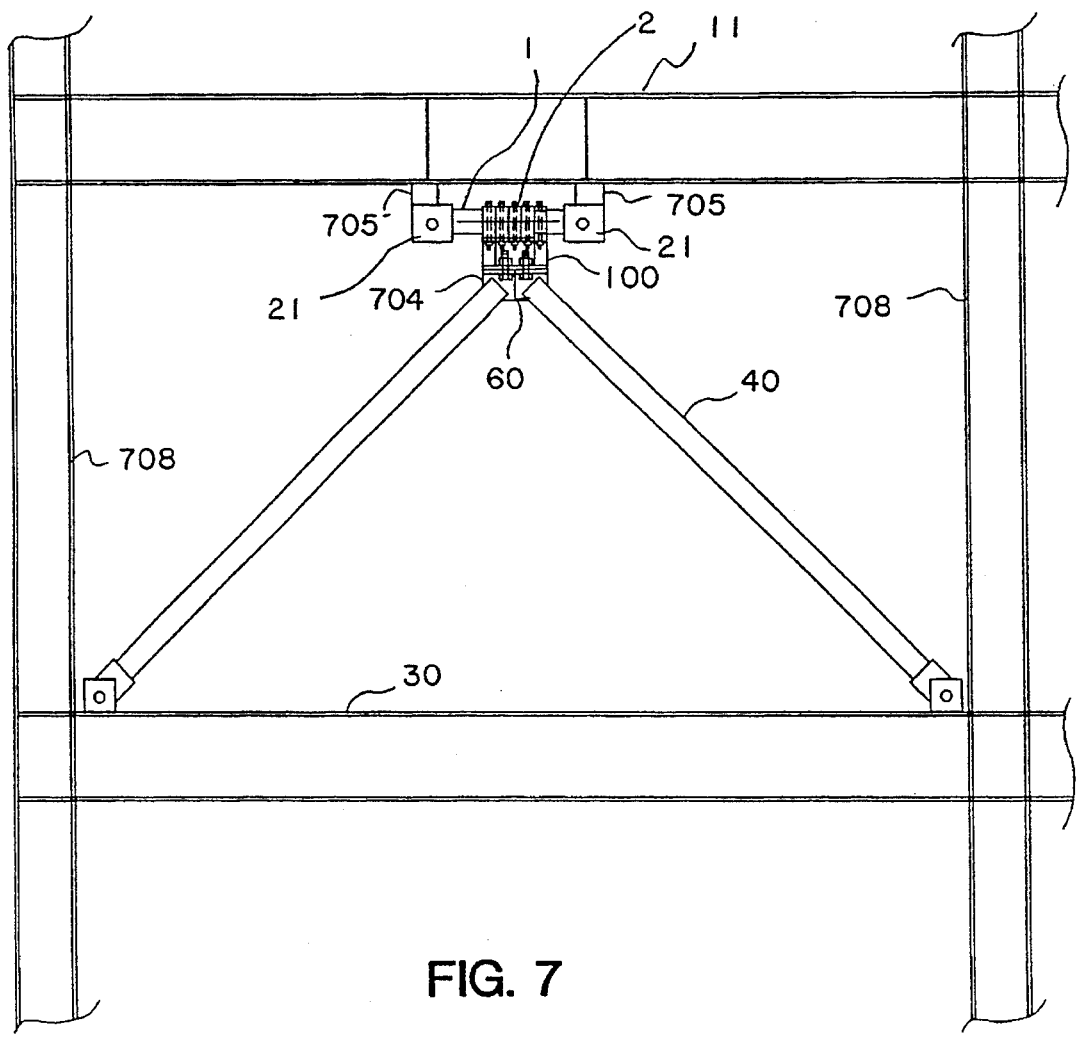
FIG. 7 is an alternate embodiment of a chevron brace configuration in a beam-to-column environment.

Referring now to FIGS. 6 and 7, seismic brake assembly 100 may suitably be mounted to a beam 11, for example in the context of a beam-to-column building arrangement such as moment resistant building frame 30. With specific reference to FIG. 6, seismic brake assembly 100 is suitably attached directly to beam 11 by channel member 4. In the embodiment shown in FIG. 6, chevron brace assembly 40 is suitably connected to respective hinge plates 21 attached to each end of pipe 1 extending from assembly 100, with the respective hinge plates 21 being pivotally secured to chevron frame 40. To reduce the bending moment applied to pipe 1 by chevron brace 40 as frame 30 moves in response to seismic activity, wind, or the like, a subframe 50 is suitably employed to distribute the load applied by chevron 40 to seismic brake 100 more linearly.

More particularly, subframing assembly 50 suitably comprises a cross bar 50A having respective braces 50B pivotally secured thereto and to respective hinge plate 21.

An alternate embodiment of the chevron embodiment is shown in FIG. 7, wherein chevron brace 40 is suitably secured directly to a bracket 704 which is rigidly secured to brake assembly 100. In the embodiment shown in FIG. 7, the respective legs comprising chevron brace 40 are suitably rigidly secured (as opposed to pivotally) to bracket 704 to reduce the bending moment on pipe 1. In addition, seismic brake assembly 100 is not secured directly to beam 11 in the embodiment shown in FIG. 7; rather, respective extensions 705 are suitably rigidly secured to beam 11, with respective hinge plates 21 being rigidly (or alternatively, pivotally) secured to respective brackets 705. Although the bending moment applied to pipe 1 in the embodiment shown in FIG. 7 may exceed that of the arrangement in FIG. 6 for a given applied lateral force to structure 30, the embodiment shown in FIG. 7 is less complex and less expensive to install. In either embodiment, a substantial amount of the applied lateral energy may be absorbed by seismic brake 100, such that correspondingly less energy will be absorbed by the various junctions between beam 11 and respective columns 608 (FIG. 6) and between beam 11 and respective columns 708 (FIG. 7).

More particularly, as lateral force is applied to frame 30, the various junctions between the beams and columns which comprise frame 30 are subject to stress. By properly configuring brake 100, including the appropriate coefficients of static friction and kinetic friction between block 2 and pipe 1 comprising the brake, brake 100 may in many applications prevent the joints of frame 30 from undergoing excessive strain.

With continued reference to FIGS. 6 and 7, as an external lateral force is applied to frame 30, chevron brace 40 transmits a portion of the applied energy to seismic brake 100, and particularly transmits this force to pipe 1 in the embodiment of FIG. 6, and to respective blocks 2 in the embodiment of FIG. 7. In either case, brake 100 essentially functions as a rigid member until the amount of force applied to it exceeds the force with which block 2 statically engages pipe 1. Once this threshold force is exceeded, i.e., once the coefficient of static friction between pipe 1 and block 2 is overcome, brake assembly 100 ceases to function as a rigid member, and pipe 1 slides through block 2 with a resistance which is a function of the coefficient of kinetic friction between the pipe and the block/or block. In this way, much of the energy applied to brake 100 may be dissipated as, inter alia, noise, thermal energy, and/or kinetic energy (to the extent material is removed from the inside surface of the collars to (or liners 3) and/or pipe 1 ). As discussed briefly above, to the extent the interface between block 2 and pipe 1 is lubricated with either a wet or dry lubricant, the noise may be reduced and, if desired, the friction coefficients at the pipe/block interface reduced. After pipe 1 moves relative to block 2 once the static frictional engagement therebetween is overcome by the applied lateral force, damper 100 is substantially restored to at or near its nominal position through the action of building frame 30.

Figures 8, 8A:
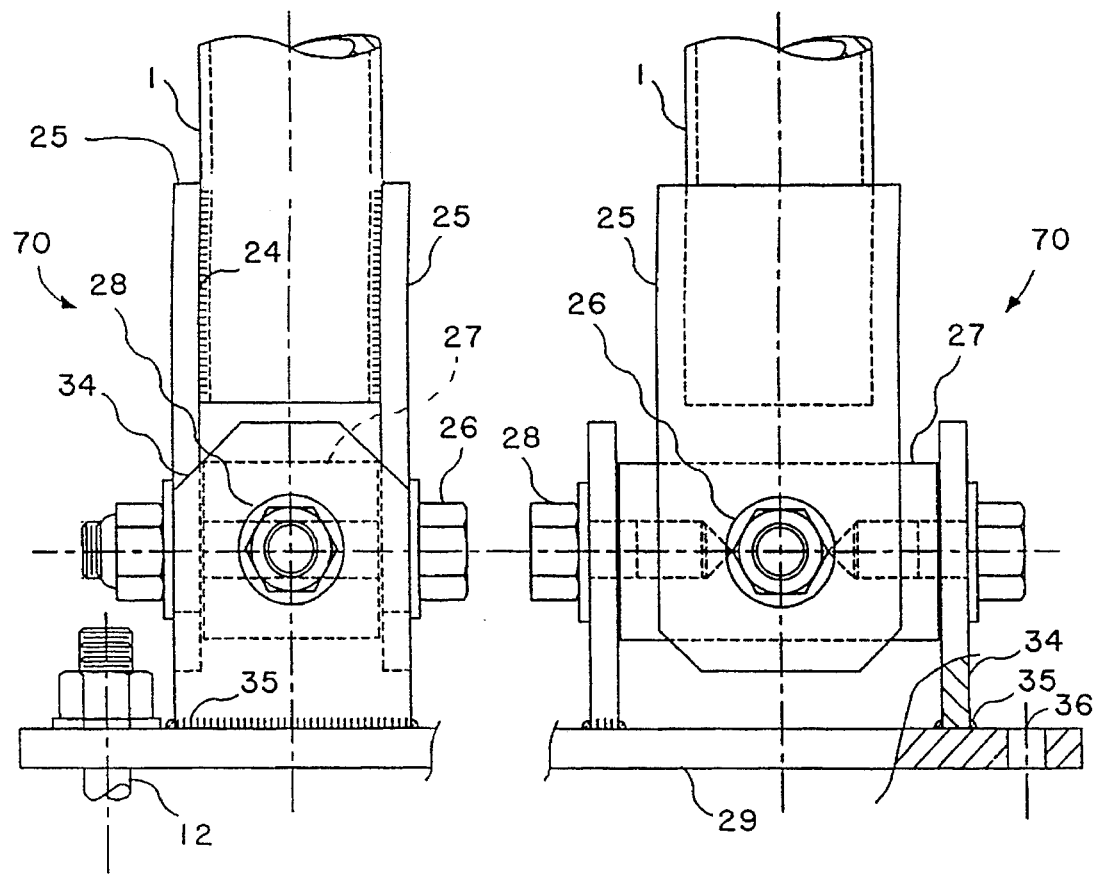
FIG. 8 and FIG. 8A illustrate an exemplary universal joint pipe end configuration.

Referring now to FIGS. 8 and 8A, a universal joint assembly 70 for use in connection with damper assembly 100 will now be described. In this regard, it is understood that brake 100 is typically secured (either fixably or pivotally) at either two or three points, namely: (1) at block 2 (or, more particularly, at a housing or bracket which is itself is fixedly secured to the back of blocks) and at one end of the pipe extending from the block; (2) at the block and at both ends of the pipe which extends through the block; and (3) at the pipe extending from one side of the block, and at a sleeve which extends from the other side of the block, which sleeve is fixed to the block, and wherein the sleeve is configured for telescopic receipt of the pipe, as discussed in greater detail below in conjunction with FIG. 14.

It will be further understood that any of the foregoing connections may be fixed (immovable) connections, or pivotal connections, as desired in a particular application, and further that the pivoting connections may be freely pivoting in all directions as provided for in the universal joint depicted in FIG. 8, or the degree of pivot may be limited to certain degrees, arcs, cones, or dimensions, as appropriate for a particular application.

With continued reference to FIG. 8, a first embodiment of universal joint 70 suitably comprises respective fork plates 25 secured to pipe 1, by any convenient mechanism, e.g., weld 24. Respective plates 25 are suitably pivotally bolted to a hinge block 27, for example by a bolt 26. Hinge block 27 is, in turn, pivotally bolted to respective fork plates 34, for example by bolt 28. Respective fork plates 34 are suitably secured to base plate 29 which is configured to be secured to the structure or mounting surface, for example through bolts 12 passing through bolt holes 36. In the embodiment shown in FIG. 8, the center lines of pipe 1, bolt 26, and bolt 28 suitably intersect at right angles in the neutral damper position.

Figure 9:
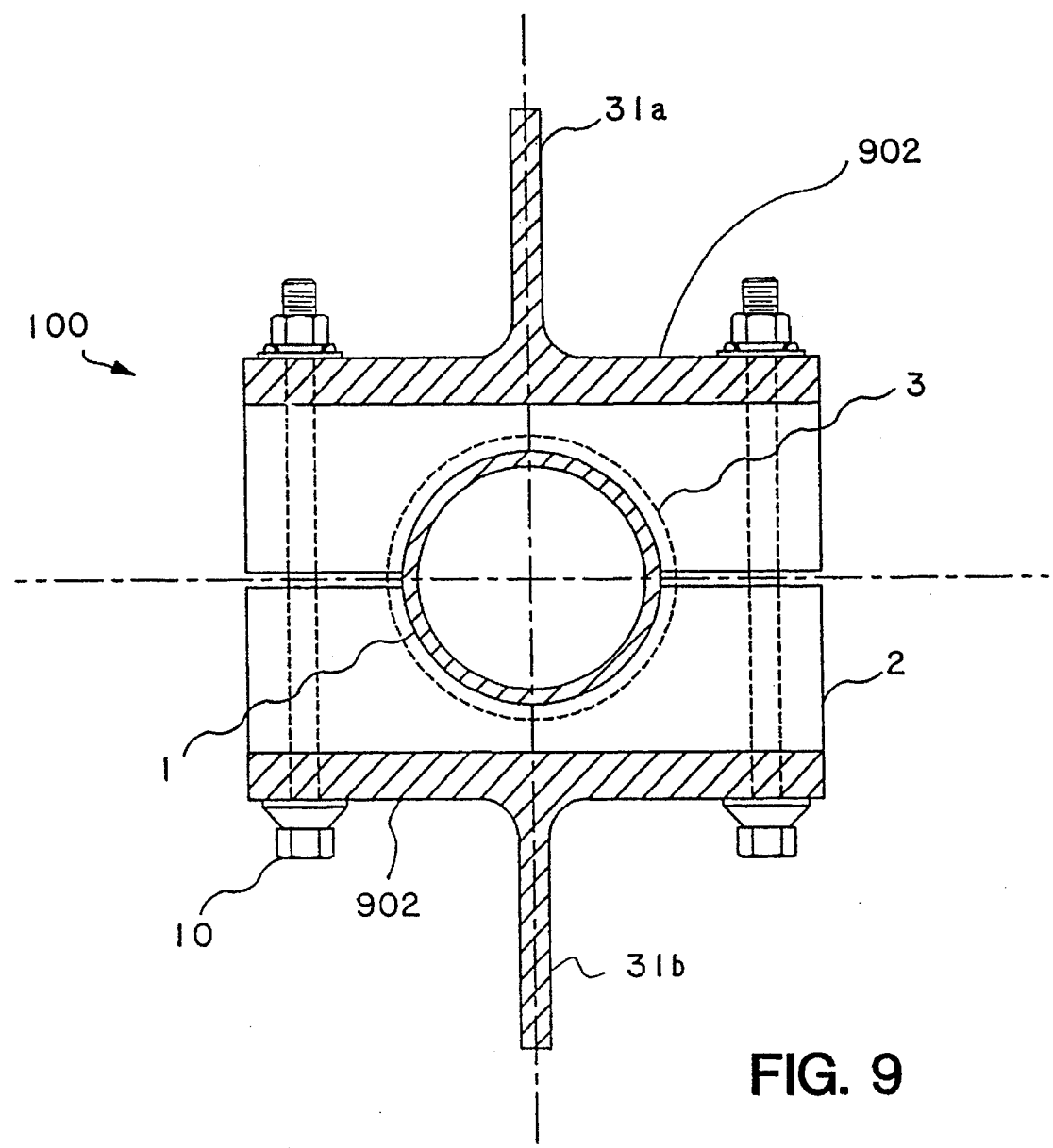
FIG. 9 is a cross-section view of an alternate mounting arrangement in accordance with an alternate embodiment of the subject invention taken along line 9—9 of FIG. 10.
Figure 10:
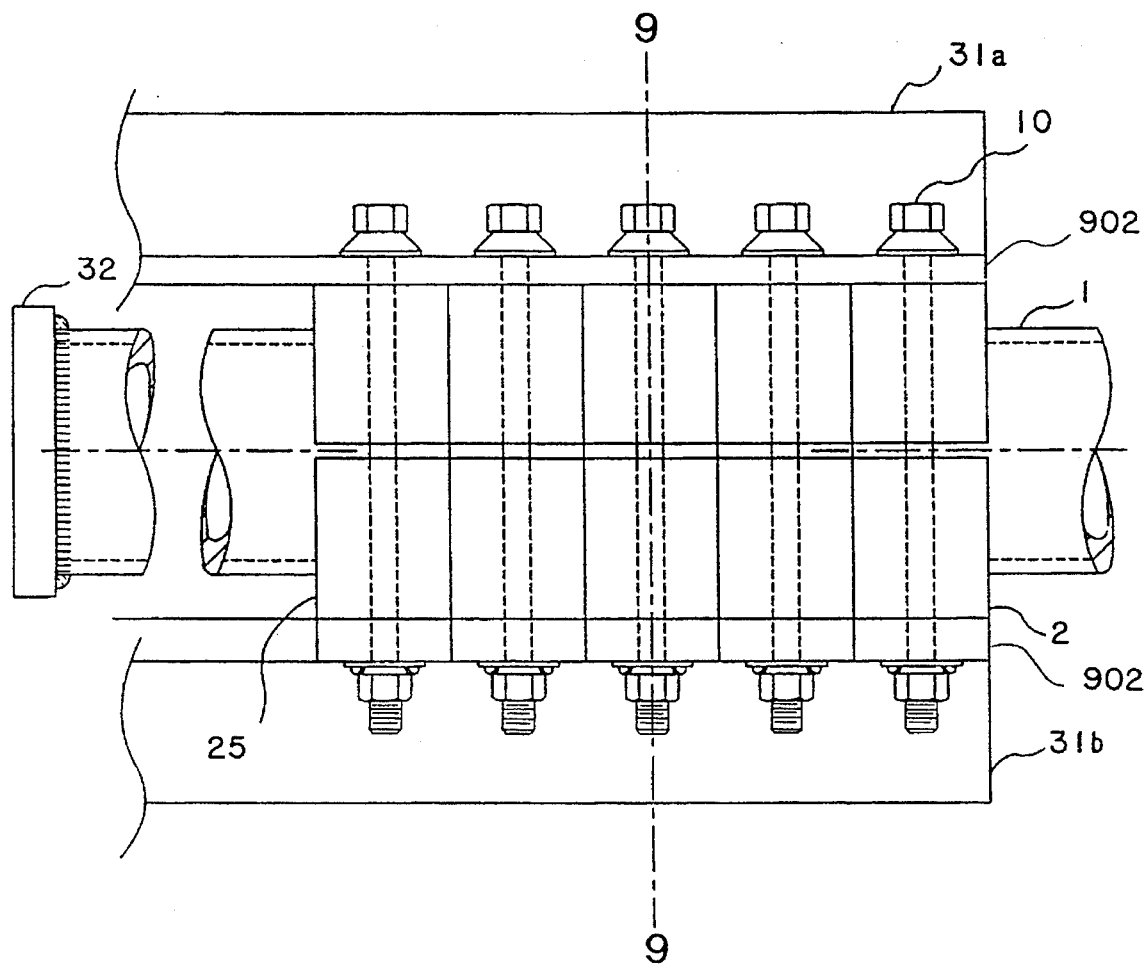
FIG. 10 is a side elevation view of the pipe and collar seismic brake arrangement shown in FIG. 9.
Figures 11, 11A:
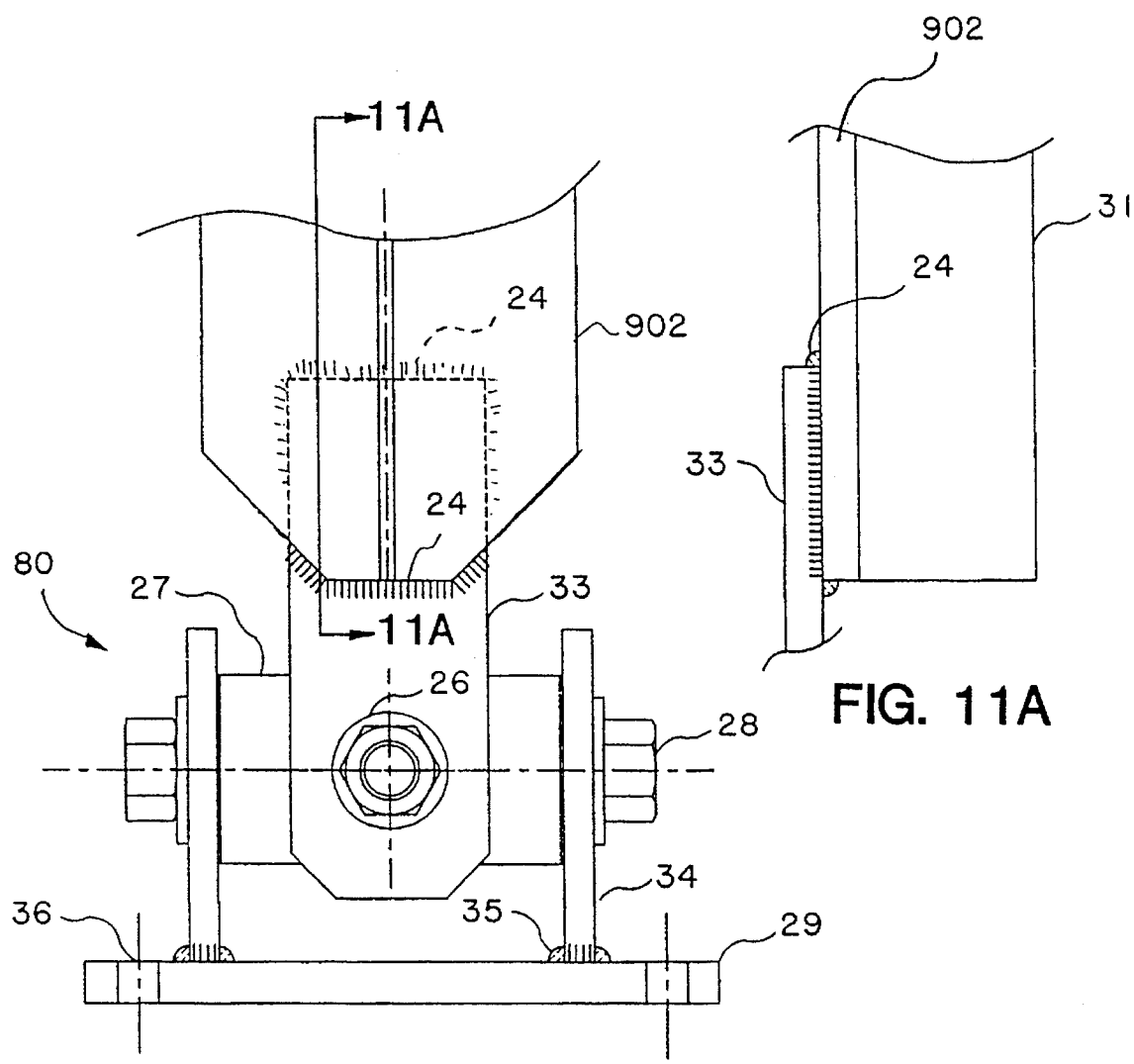
FIG. 11 illustrates an alternate universal joint termination.
FIG. 11A is a cross-section view of a portion of the universal joint taken along line 11A—11A in FIG. 11.

Referring now to FIGS. 9–11, an alternate embodiment for attaching brake assembly 100 to a universal joint will now be described.

With particular reference to FIG. 9, brake assembly 100 comprises pipe 1, liner 3, and block 2, as described above, secured together through the use of a bolt assembly 10 as also previously described. However, in the embodiment shown in FIG. 9, block assembly 2 is suitably secured to respective channel beams 31a and 31b, each comprising a flange 902. Referring now to FIG. 10, pipe 1 is suitably equipped with an end plate 32 secured to an end thereof, for example by welding. End plate 32 functions as a displacement limiter, defining maximum stroke for brake assembly 100 at the point where end plate 32 contacts shoulder 2s at the leftmost edge of block 2 as seen in FIG. 10. As shown in FIG. 10, at least one of channels 31a and 31b suitably extend to the left in FIG. 10 to a length sufficient to facilitate attachment of the assembly to a universal joint, as described in greater detail below in connection with FIG. 11.

Referring now to FIG. 11, one or both of flanges 902 are suitably secured to an extension plate 33 which is suitably pivotally bolted to hinge block 27 by bolt 26. Hinge block 27 is suitably rotatably mounted to fork plates 34, for example by bolt 28, much as described above in connection with FIG. 8. As seen in FIG. 11A, extension plate 33 may be secured to channel plate 31 in any convenient manner, for example by a weld 24.

Referring now to FIGS. 12A through 12D, various applications of brake 100 are illustrated. With momentary reference to FIG. 12A, brake 100 may be suitably secured to the top of a high-rise building or other structure 200, with a cable 101 secured near the bottom of the structure and to each end of pipe 1. Cable 101 advantageously passes through respective pulleys 103, as shown. As lateral forces applied to structure 200 either from the left or the right in FIG. 12A exceed the design threshold for brake 100, pipe 1 will slide through block 2, thereby absorbing some of the applied energy, damping the system. In cable applications such as that shown in FIG. 12A, it may be desirable to prestress cable 101, to remove at least some of the elastic deformation which cable 101 would otherwise undergo upon the application of applied lateral forces to structure 200.

Referring now to FIG. 12D, an alternate embodiment of the a cable actuated system is shown, wherein pulleys 103 support cable 102 which is suitably anchored to the ground at points G as well as to both ends of pipe 1. The arrangement shown in FIG. 12D is particularly advantageous in circumstances where retrofitting or structural augmentation would be cumbersome or otherwise not practical in the interior of the structure. In such circumstances, it may be desirable to secure brake assembly 100 to the outside of the structure, as desired.

Referring now to FIGS. 12B and 12C, a seismic isolated building 300 is suitably supplemented by respective telescoping dampers 600, discussed in greater detail below in conjunction with FIGS. 14A–14I. With particular reference to FIG. 12B, respective dampers 600 are suitably connected between building 300 and retaining walls 500, such that the dampers bridge the isolation space 501 between structure 300 and isolation perimeter wall 500. It can be seen that the dampers 600 may be oriented orthogonally (as in damper 612), or diagonally (as in damper 614), as desired. As best seen in FIG. 12B, orthogonally oriented damper 612 dampens translational movements, while dampers 614 effectively dampen torsional or rotational movements of structure 300.

FIG. 12C illustrates building 300 in partial cross-section, showing the dampers 600 expanding isolation space 501 between retaining wall 500 and structure 300. In addition, building 300 may be suitably supported by respective seismic base isolators 700. As seen in FIGS. 12B and 12C, the use of dampers 600 in the manner shown reduces the amount of clearance needed between walls 500 and building 300, thereby reducing the cost of the seismic joints and, indeed, of the isolation space itself.

Referring now to FIG. 13A–13I, the relationship between various embodiments of the subject seismic brake in the desired hysteresis loop exhibited by the damper will now be described.

Figure 13A:
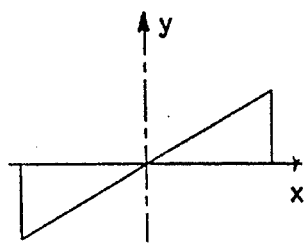
FIG. 13A through 13C are graphs of alternative hysteresis loops useful in the context of the present invention.

With particular reference to FIG. 13A, a triangular seismic hysteresis loop is shown, wherein the abscissa (the "x" axis) corresponds to displacement and the ordinate (the "y" axis) corresponds to the force required to achieve the displacement in the context of a structural system damped with a seismic brake. As can be seen, force is substantially linear with displacement in FIG. 13A.

Figure 13D:
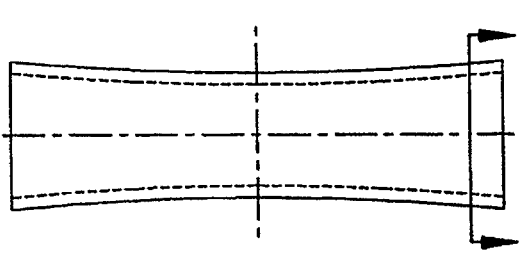
FIG. 13D through 13F illustrate alternative pipe outer diameter configurations corresponding to graphs 13A–13C, respectively.
Figure 13G:
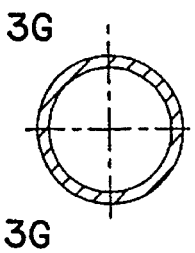
FIG. 13G through 13I are cross-section views taken along lines 13G—13G-13I—13I from FIGS. 13D–13F, respectively.
Figure 13B:
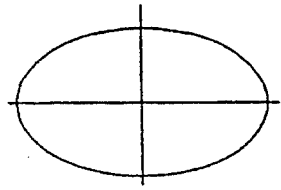

Referring now to FIG. 13B, an elliptical hysteretic loop is shown, wherein less applied force is needed to achieve the same displacement, particularly at the displacement limits.

Figure 13E:
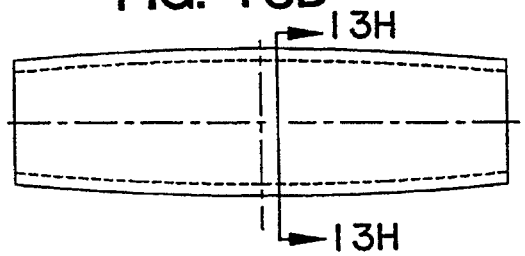
Figure 13H:
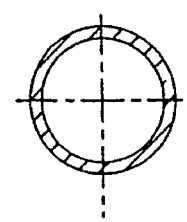
Figure 13C:
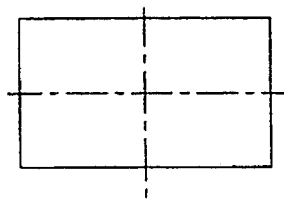

Referring now to FIG. 13C, a more traditional rectangular hysteresis loop is shown. In accordance with one aspect of the present invention, it is anticipated that the use of a pipe 1 in the context of seismic brake 100 which has a constant diameter (See FIG. 13F and FIG. 13I) may be configured to yield a rectangular hysteretic loop of the type shown in FIG. 13C. If, on the other hand, other hysteresis characteristics are desired, various parameters associated with seismic brake 100 may be manipulated, as described in greater detail below.

Referring now to FIG. 13D and 13G, it is possible to achieve a hysteresis response which approximates that shown in FIG. 13A by configuring pipe 1 as shown in FIG. 13D. In particular, the diameter of the rod is suitably smallest at the nominal damper position, gradually increasing towards the displacement limits on either side of the nominal position of the rod. Although these diametrical changes are greatly exaggerated in the Figures for illustration purposes, it will be understood that the actual changes in diameter will be on the order of 1/100 to 1/10,000 of the pipe diameter, and more particularly in the range of 1/1,000 of a pipe diameter. With continued reference to FIG. 13D, it can be seen that as pipe 1 slides in either direction from its nominal position, the resistance to further slippage increases as a function of, among other things, the rate at which the diameter of the rod increases from the nominal position to the fully displaced position. In accordance with one aspect of the present invention, the rate of change of the diameter of the rod generally follows a hyperbolic function.

Referring now to FIG. 13E, a varying diameter rod is shown which may be used in conjunction with a properly configured seismic brake, as discussed herein, to yield the substantially elliptical hysteresis performance characteristic shown in FIG. 13B. In accordance with one aspect of this invention, the diametrical changes shown in FIG. 13E generally follow a parabolic function, although any suitable contour may be employed to achieve virtually any desired output response of the damper in response to applied forces. With continued reference to FIG. 13B, it can be seen that for an essentially constant spring force applied to the rod by the gripping blocks, the magnitude of the resistance to slippage decreases as the rod moves in either direction from its nominal position.

Figure 13F:
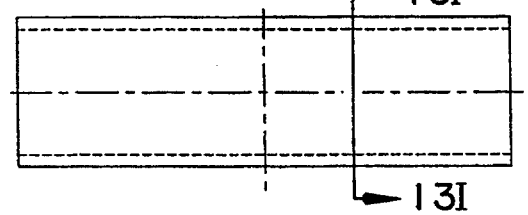
Figure 13I:
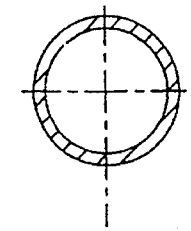

In accordance with yet a further aspect of the present invention, various hysteresis loops and other performance characteristics, including but not limited to those shown in FIGS. 13A–13C, may be achieved by manipulating various other parameters associated with seismic brake 100, in addition to or in lieu of varying the rod configuration as reflected in FIGS. 13D–13F. For example and with momentary reference to FIG. 1, it may be desirable to dynamically control the force with which the gripping block engages the rod, either during static engagement of the rod by the gripping block, dynamic (i.e., sliding) engagement of the rod by the block, or both. In this regard, it may be desirable to employ a washer (or spring) 9 capable of exhibiting a controllable amount of force on the gripping block, to thereby dynamically control the resistance to slippage between rod 1 and gripping block 2. For example, an electrical coil, a solenoid, accelerometer, or any other suitable electrical, mechanical, or chemical device may be used in conjunction with or in lieu of the bolt assembly shown in FIG. 1 to thereby controllably vary the force exerted by the gripping blocks on the rod, as desired. Moreover, it may also be desirable to vary this force in a controlled manner as a function of one or more parameters, including the position of the rod with respect to the gripping block, the velocity of the rod with respect to the gripping block, or the acceleration of one or both of the rod and gripping block. Indeed and as briefly discussed above, it may be desirable to configure one or more gripping blocks in an integral housing, which may facilitate the use of hydraulic or pneumatic mechanisms for varying the force which the gripping block (or its liner) applies to the rod.

Figures 14A, 14B, 14C, 14D, 14E, 14F, 14G, 14H, 14I:
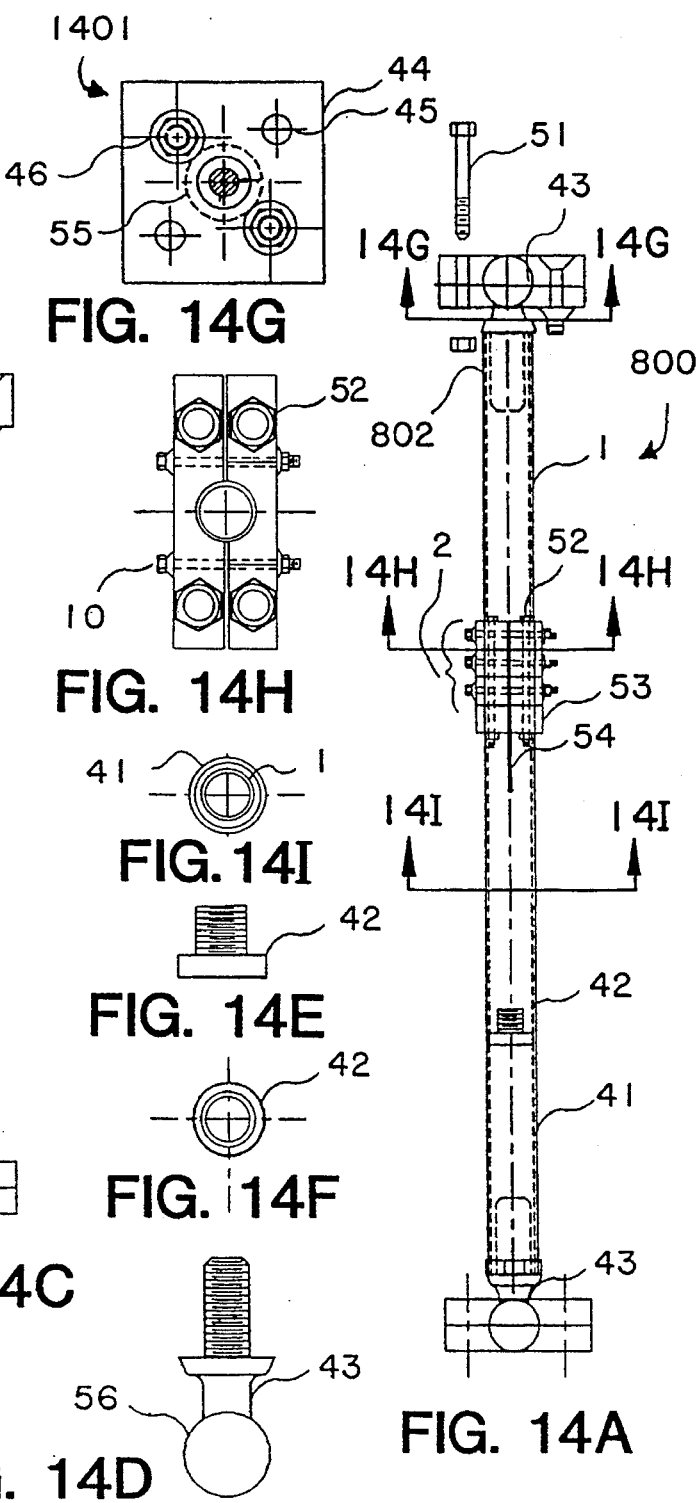
FIG. 14A is a top plan view of a telescoping arrangement of an exemplary seismic brake assembly in accordance with an alternate embodiment of the present invention, shown in its nominal position.
FIG. 14B and 14C show the telescoping arrangement of FIG. 14A in the fully extended and fully retracted positions, respectively.
FIG. 14D is a close up view of an exemplary ball head used in the telescoping arrangement of FIG. 14A.
FIG. 14E and 14F are front and top views, respectively, of the end cap shown in FIG. 14A.
FIG. 14G is a cross-section view of the ball head mounting apparatus taken along line 14G—14G FIG. 14A.
FIG. 14H is a cross-section view of the collar/pipe interface taken along line 14H—14H of FIG. 14A.
FIG. 14I is a cross-section view of the telescoping outer and inner pipes taken along line 14I—14I of FIG. 14A.

Referring now to FIGS. 14A–14I, FIG. 14A illustrates a telescoping seismic brake assembly 800, shown in its neutral (e.g., nominal) position. More particularly, assembly 800 suitably comprises a pipe or rod 1 configured to be gripped by gripping block 2 as described above in conjunction with, among others, FIGS. 1 and 2. In addition, a junction block 53 is suitably secured to block 2, for example by one or more bolts 52 extending parallel to the axis of rod 1. Junction block 53 is suitably secured, for example by a weld (e.g., perimeter weld) to a sleeve 41, such that as pipe 1 extends downwardly (as shown in FIG. 14A) through block 2, rod 1 may be telescopically received within sleeve 41. As best seen in FIG. 14I, sleeve 41 is suitably concentric (e.g., coaxial) with and circumscribed about that portion of pipe 1 which is received within sleeve 41, the length of which portion varies depending on whether assembly 800 is expanded (See FIG. 14B) or retracted (See FIG. 14C) from its nominal position (FIG. 14A). In any event, although block 2 frictionally engages pipe 1 during operation of assembly 800, in the illustrated embodiment block 2 does not frictionally engage sleeve 41; rather, sleeve 41 is suitably rigidly "attached" to block 2 by junction block 53.

With continued reference to FIG. 14A, rod 1 suitably terminates in a ball head 43 comprising a "universal" head 56 configured to be secured to the structure. As briefly discussed above, although assembly 800 is shown with a universal joint-type coupling (i.e., ball head 43), it will be understood that the distal end 802 of rod 1 may be secured in any desired manner, e.g. fixedly, or in a manner which permits movement in less than all degrees of freedom.

With continued reference to FIGS. 14A–14I, the end of rod 1 received within sleeve 41 suitably terminates in an end plug 42, for example as shown in front view in FIG. 14E and in plan view in FIG. 14F. End plug 42 suitably functions as a displacement limiter in one or both of either the expanded and extended positions shown in FIGS. 14B and 14C, respectively.

More particularly, end plug 42 may be configured to contact junction block 53 and thereby prevent further expansion of assembly 800 when in its fully retracted position (See FIG. 14B). Moreover, end plug 42 may so function as a displacement limiter by contacting ball head 43 at the opposite end of assembly 800 when the assembly is in its fully retracted position (See FIG. 14C).

With momentary reference to FIGS. 14G and 14H, a universal joint 1401 for receiving ball 56 of ball head 43 suitably comprises respective mating base plates 44 configured to encase head 43 within a ball housing 55 when base plates 44 are secured together, for example through the use of a weld or respective bolts 46.

With continued reference to FIG. 14A, it may be desirable to place a single slot 54 or, alternatively, oppositely disposed slots 54 one hundred eighty degrees apart extending axially along a portion of the annulus which comprises sleeve 41, near the point where junction block 53 engages the end of the sleeve. In this way, the end of sleeve 41 may be compressed slightly to facilitate the attachment of junction block 53 thereto.

Referring now to FIGS. 15A–15C, various alternate embodiments of brake 100 are shown. With particular reference to FIG. 15A, brake assembly 100 is shown attached to a channel bracket 61 particularly useful for mounting brake 100 to a roof, ceiling, or the like.

Referring now to FIG. 15B, assembly 800 is shown in an adaptation particularly useful in the context of the chevron mounting schemes shown in FIGS. 6 and 7.

Referring now to FIG. 15C, a variation of seismic brake 100 is shown adapted for use in seismic isolation damping. Respective plates 63 are suitably secured to block 2 in each of the assemblies, with each plate 63 being secured (e.g., welded) to a short telescoping pipe assembly 62. In this way, structures may be supplementally damped in a plurality of directions. In accordance with a further aspect of dual assembly 900 shown in FIG. 15C, telescoping pipe 62 may be eliminated if, for example, base isolator uplift and compression strain is properly limited, for example through the use of a rubber or other bearing disposed between the two brake assemblies which comprise assembly 900.

Figure 16A:
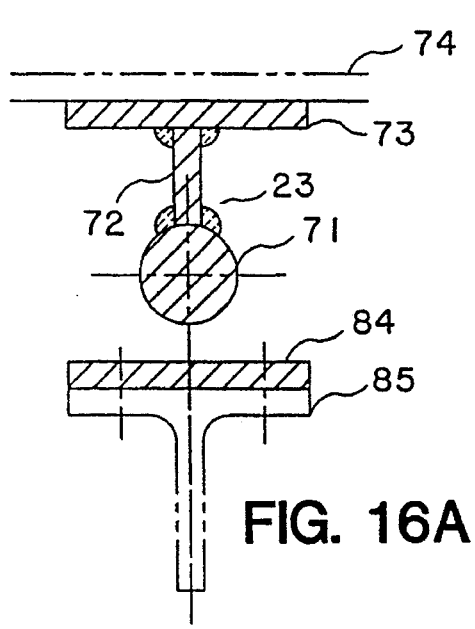
FIG. 16A is a front cross-section view of a pipe mounting configuration taken along line 16A—16A of FIG. 16C.
Figure 16B:
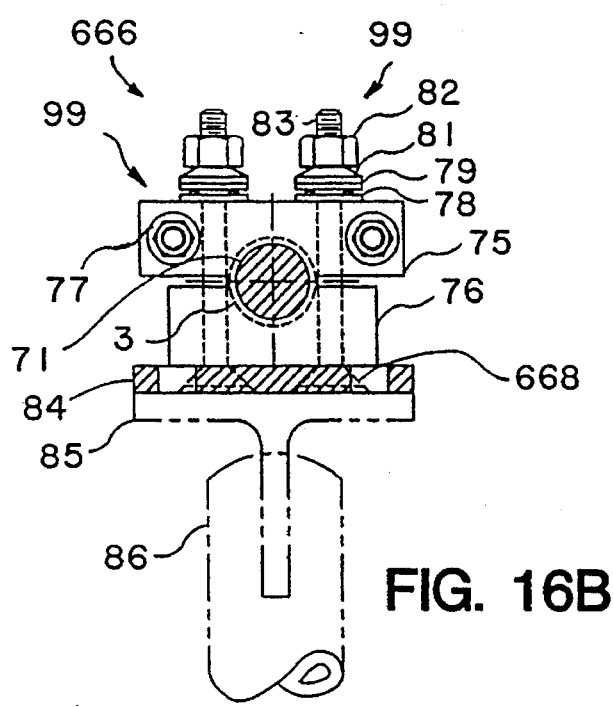
FIG. 16B is a more detailed view of the alternate seismic brake assembly of FIG. 16A.

Referring now to FIG. 16B, a brake assembly adaptable for use in, inter alia, the chevron configuration shown in FIG. 6 suitably comprises a brake assembly 666 wherein a steel rod 71 is frictionally gripped between a first block 75 and a second block 76, with respective blocks 75 and 76 being urged together by respective bolting assemblies 99.

Figure 16C:
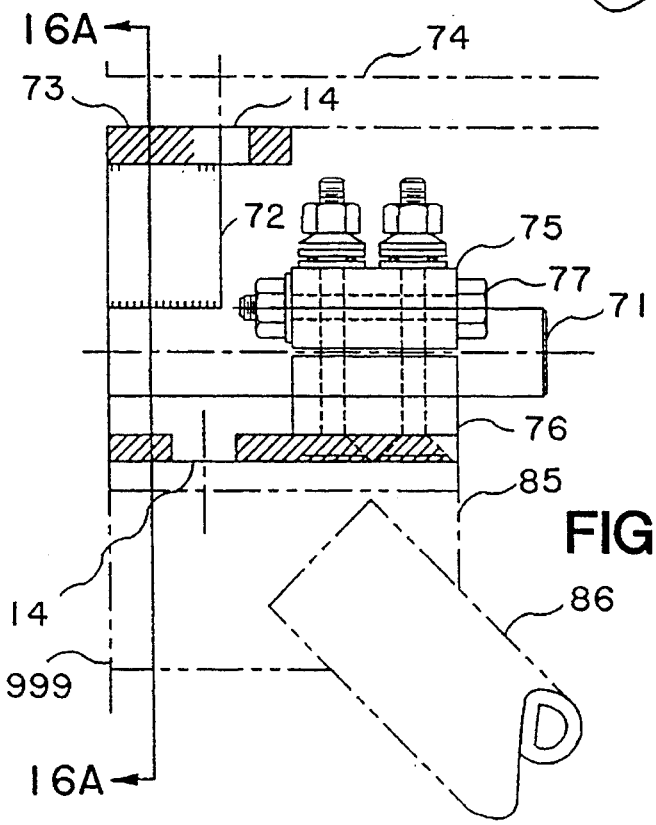
FIG. 16C is a side view of the seismic brake assembly shown in FIG. 16B.

More particularly and with reference to FIGS. 16A–16C, bolt assembly 99 suitably comprises a bolt 83 having a counter-sunk head 668, a cup washer 81, a tension indicating washer 78, and a flat washer 79 held together by a nut 82.

With continued reference to FIGS. 16A–16C, pipe 71 is suitably welded to a flange 72, for example by weld 23. Flange 72 is suitably secured to base plate 73 which may be bolted or otherwise secured to the building or other structure 74.

A first leg 86 of a chevron brace is suitably secured to a chevron head 85; chevron head 85 is suitably bolted to a base plate 84. Base plate 84 is suitably secured to block 76, for example by bolts 83. In this way, the block assembly moves relative to rod 71 along with chevron base plate 84 and chevron head 85, while rod 71 remains fixedly attached to structure 74 through flange 72 and mounting plate 73. In the event a plurality of blocks 75 (as opposed to a single block) are employed, they may be suitably secured together by any convenient mechanism, for example by bolting them together by one or more bolts 77. Although the assembly shown in FIGS. 16B and 16C may be suitably adapted to form a functional damping brake, it will be appreciated that the structure shown in FIG. 16C is suitably replicated on the other side of symmetry line 999 to produce a more force-balanced system.

Figure 17A:
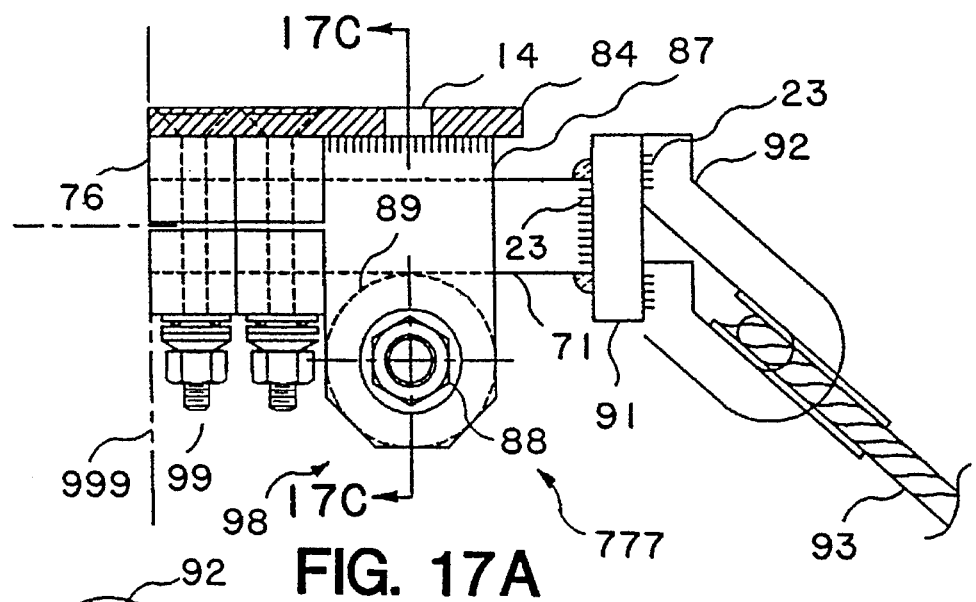
FIG. 17A is a partial view of a chevron cable activated seismic brake with a steel rod substituted for the steel pipe in accordance with yet a further alternate embodiment of the present invention.
Figure 17B:
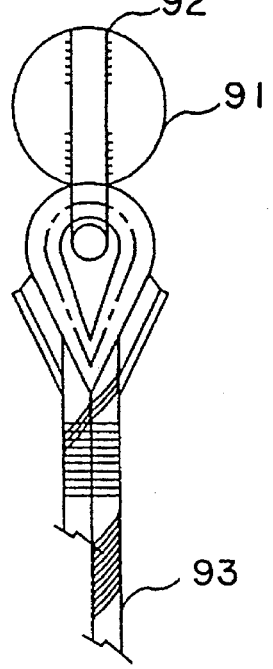
FIG. 17B is an end view of the cable anchoring assembly shown in FIG. 17A.
Figure 17C:
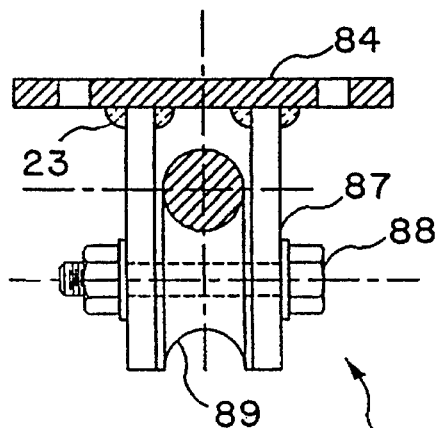
FIG. 17C is a cross-section view of the pulley assembly taken along line 17C—17C of FIG. 17A.

Referring now to FIGS. 17A–17C, a cable-actuated damping brake is shown, for example one adapted for use in a chevron configuration.

With particular reference to FIG. 17A, cable-actuated brake assembly 777 suitably comprises a rod 71 having a suitable end cap 91 secured thereto, for example by a weld 23. A hook assembly 92 is suitably welded to end cap 91, which hook assembly is configured to receive one end of a cable 93. Rod 71 is gripped by one or more gripping blocks 76, which frictionally engage rod 71, for example through the application of force by respective bolt assemblies 99.

Blocks 76 are suitably secured to the structure through base plate 84. Base plate 84 is advantageously secured to the building or other structure by any convenient method, for example through a plurality of bolts extending through bolt holes 14.

For applications of the damper assembly 777 shown in FIG. 17A for which forces are applied to rod 71 other than along the axis of the rod, for example in the chevron configuration shown in FIG. 17A, it may be desirable to provide supplemental support for rod 71 to reduce bending movements in the rod. For this purpose, a pulley assembly 98 may be employed, suitably comprising respective side plates 87 secured to base plate 84, with a pulley 89 being rotatably mounted to respective plates 87, for example through a bolt 88. In this regard, to the extent downward forces are applied to pulley 89 and, hence, a downward vector component is transmitted through sideplates 87 to base plate 84, it may be desirable to place at least one anchor bolt through bolt hole 14 disposed directly above the rotating axis of pulley 89 as shown in FIG. 17A.

The foregoing arrangements and embodiments of the subject seismic brake provide a number of advantages over prior art dampers. For example, the degree of resistance to sliding motion between the rod and the blocks can be controlled in accordance with a number of parameters, including the relative position of the rod with respect to the blocks, and many other factors. This permits the use of the subject seismic brake in a number of applications. Moreover, the materials used at the friction surfaces may be selected and/or selectively lubricated to achieve optimum static and dynamic friction coefficients between the sliding members.

More particularly, for wind applications wherein the coefficient of static friction is desirably in the range of 5% greater than the coefficient of kinetic friction, these friction coefficients may be controlled and even changed in the field without having to replace the brake. For example, through the use of various lubricants, the friction coefficients may be dramatically altered. Moreover, the construction of the subject brake assemblies permits the inspection and/or replacement of various components, particularly lining 3, to achieve optimum performance even when the assemblies are installed in a building or other structure.

While virtually any suitable materials for the blocks, liners, and rods or pipes may be used in the context of the subject invention, in a preferred embodiment the lining material is suitably softer than the pipe, such that the lining material has a lower friction coefficient.

Moreover, the use of various chevron and other brace configurations, and particularly the use of cable-actuated braking assemblies, admits of a wide variety of uses of the subject seismic brake not heretofore achievable in prior art systems. For example, cable-actuated and thin bracket mounted assemblies may be installed in intrastory applications in walls or between partitions which are only a few inches wide.

The ease of installation associated with the various seismic brake configurations discussed herein also provides substantial motivation for retrofitting existing buildings, even buildings which have been damaged by earthquakes. In particular, beam-to-column building frame assemblies which have experienced joint damage as a result of prior seismic activity may be retrofitted with the subject seismic brake, and in many applications these buildings may be retrofitted without having to repair the damaged or fractured beam/column joints.

Although the subject invention has been described largely in the context of the appended drawing figures, the scope of the invention is not so limited. Various changes, modifications, enhancements and substitutions may be made in the design and arrangement of the parts and materials discussed herein, without departing from the spirit and scope of the present invention as set forth in the appended claims.

I claim:

1. A seismic brake assembly for damping relative motion between a first and a second datum in buildings and other structures, comprising:

an elongated pipe having a first end secured at said first datum;

a gripping block secured to said second datum and configured to frictionally grasp said pipe; and a bolt assembly configured to controllably compress said gripping block to produce a frictional force of a predetermined magnitude at the interface between said block and said pipe.

2. The brake assembly of claim 1, wherein said pipe, said gripping block, and said bolt assembly are configured such that said brake assembly functions as a rigid member for applied lateral stresses less than a threshold level, and wherein said brake assembly simulates an elastically deforming member for applied lateral forces which exceed said threshold level.

3. The brake assembly of claim 1, further comprising means for controlling the degree of frictional engagement between said pipe and said gripping block to produce a predetermined hysteretic loop response.

4. The brake assembly of claim 1, wherein said gripping block comprises respective first and second block segments, each said block segment comprising a substantially semicircular recess and a bolt hole extending therethrough, and wherein said bolt assembly comprises at least two bolts extending through respective bolt holes in said first and second block segments to thereby urge said first and second block segments together with a predetermined force to effect said frictional engagement between said gripping block and said pipe.

5. The brake assembly of claim 4, further comprising a liner interposed between said pipe and each of said first and second block segments, said liner defining the frictional interface with said pipe.

6. The brake assembly of claim 1, further comprising a lubrication path extending through said gripping block for supplying lubricant to the frictional interface between said pipe and said gripping block.

7. The brake assembly of claim 6, wherein said lubricant comprises dry lubricant.

8. The brake assembly of claim 6, wherein said lubricant comprises a wet lubricant.

9. The brake assembly of claim 6, wherein said lubricant comprises a graphite particulate.

10. The brake assembly of claim 1, wherein said bolt assembly comprises means for dynamically controlling the degree of frictional engagement between said pipe and said gripping block.

11. The brake assembly of claim 10, wherein said controlling means comprises a cup washer.

12. The brake assembly of claim 10, wherein said controlling means comprises a coil, and wherein the degree of frictional engagement between said pipe and said gripping block is controllable as a function of the magnitude of current supplied to said bolt assembly.

13. The brake assembly of claim 1, wherein said gripping block comprises a plurality of similarly configured blocks, each secured to a common base plate.

14. The brake assembly of claim 1, wherein at least one of said first and second datum comprises a universal joint.

15. The brake assembly of claim 1, further comprising a cable mounted to said pipe and to said gripping block, said cable also being mounted to a foundation associated with said building.

16. A seismic brake useful in damping seismic forces in a beam to column building frame, comprising:

a pipe having a distal end secured to a beam;

a sleeve having a distal end secured to a column, said sleeve being substantially coaxial with said pipe and configured to receive at least the proximal end of said pipe therewithin; and a block rigidly secured to the proximal end of said sleeve, said block configured to frictionally engage said pipe with a predetermined frictional force such that said brake functions as a rigid body for applied seismic forces less than a first amplitude;

wherein said pipe slides relative to said block for applied seismic forces greater than said first amplitude.

17. The brake of claim 16, further comprising a liner interposed between said pipe and said block, said liner defining the frictional interface with said pipe.

18. The brake of claim 16, further comprising a lubrication path extending through said block for supplying lubricant to the frictional interface between said pipe and said block.

19. The brake of claim 16, further comprising a bolt assembly, wherein said bolt assembly comprises means for dynamically controlling the degree of frictional engagement between said pipe and said block.

20. The brake of claim 19, wherein said controlling means comprises a coil, and wherein the degree of frictional engagement between said pipe and said block is controllable as a function of the magnitude of current supplied to said bolt assembly.

* * * * *